(12) United States Patent
Parada San Martin et al.

(10) Patent No.: US 9,715,660 B2
(45) Date of Patent: Jul. 25, 2017

(54) TRANSFER LEARNING FOR DEEP NEURAL NETWORK BASED HOTWORD DETECTION

(71) Applicant: Google Inc., Mountain View, CA (US)

(72) Inventors: Maria Carolina Parada San Martin, Palo Alto, CA (US); Guoguo Chen, Baltimore, MD (US); Georg Heigold, Mountain View, CA (US)

(73) Assignee: Google Inc., Mountain View, CA (US)

( * ) Notice: Subject to any disclaimer, the term of this patent is extended or adjusted under 35 U.S.C. 154(b) by 561 days.

(21) Appl. No.: 14/230,225

(22) Filed: Mar. 31, 2014

(65) Prior Publication Data

US 2015/0127594 A1 May 7, 2015

Related U.S. Application Data

(60) Provisional application No. 61/899,449, filed on Nov. 4, 2013.

(51) Int. Cl.
*G06N 3/04* (2006.01)
*G06N 7/00* (2006.01)
*G10L 15/16* (2006.01)
*G10L 15/08* (2006.01)

(52) U.S. Cl.
CPC ........... *G06N 7/005* (2013.01); *G06N 3/0454* (2013.01); *G10L 15/16* (2013.01); *G10L 2015/088* (2013.01)

(58) Field of Classification Search
CPC ............................... G06N 3/04; G06N 3/0454
See application file for complete search history.

(56) References Cited

U.S. PATENT DOCUMENTS

| 6,041,299 A * | 3/2000 | Schuster ................. G10L 15/16 704/232 |
| 2012/0245934 A1 | 9/2012 | Talwar et al. |
| 2016/0110642 A1* | 4/2016 | Matsuda ................. G06N 3/08 706/25 |

OTHER PUBLICATIONS

Ahmed et al., "Training Hierarchical Feed-Forward Visual Recognition Models Using Transfer Learning from Pseudo-Tasks," ECCV 2008, Part III, LNCS 5304, 69-82, 2008.
Zhang et al., "Transfer Learning for Voice Activity Detection: A Denoising Deep Neural Network Perspective," INTERSPEECH2013, Mar. 8, 2013, 5 pages.

(Continued)

*Primary Examiner* — Vincent Gonzales
(74) *Attorney, Agent, or Firm* — Fish & Richardson P.C.

(57) ABSTRACT

Methods, systems, and apparatus, including computer programs encoded on computer storage media, for training a deep neural network. One of the methods includes training a deep neural network with a first training set by adjusting values for each of a plurality of weights included in the neural network, and training the deep neural network to determine a probability that data received by the deep neural network has features similar to key features of one or more keywords or key phrases, the training comprising providing the deep neural network with a second training set and adjusting the values for a first subset of the plurality of weights, wherein the second training set includes data representing the key features of the one or more keywords or key phrases.

24 Claims, 8 Drawing Sheets

(56) References Cited

OTHER PUBLICATIONS

Yu et al., "Deep Learning with Kernel Regularization for Visual Recognition," Advances in Neural Information Processing Systems 21, Proceedings of the 22$^{nd}$ Annual Conference on Neural Information Processing Systems, Dec. 8-11, 2008 1-8.
Swietojanski et al., "Unsupervised cross-lingual knowledge transfer in DNN-based LVCSR," In Proc. IEEE Workshop on Spoken Language Technology, Miami, Florida, USA, Dec. 2012, 6 pages.
Srivastava et al., "Discriminative Transfer Learning with Tree-based Priors," Advances in Neural Information Processing Systems 26 (NIPS 2013), 12 pages.
Sutton et al., "Composition of Conditional Random Fields for Transfer Learning," in Proceedings of HLT/EMNLP, 2005, 7 pages.
Ciresan et al., "Transfer learning for Latin and Chinese characters with Deep Neural Networks," The 2012 International Joint Conference on Neural Networks (IJCNN), Jun. 10-15, 2012, 1-6 (abstract only), 2 pages.
Huang et al., "Cross-language knowledge transfer using multilingual deep neural network with shared hidden layers", in Proc. ICASSP, 2013, 7304-7308.
Science Net [online]. "Deep Learning workshop ICML 2013," Oct. 29, 2013 [retrieved on Jan. 24, 2014]. Retrieved from the internet: URL<htip://blog.sciencenet.en/blog-701243-737140.html>, 13 pages.
Collobert et al., "A Unified Architecture for Natural Language Processing: Deep Neural Networks with Multitask Learning," Proceedings of the 25$^{th}$ International Conference on Machine Learning, Helsinki, Finland, 2008, 8 pages.
Bengio, "Deep Learning of Representations for Unsupervised and Transfer Learning," JMLR: Workshop and Conference Proceedings 27:17-37, 2012.
Zeiler et al., "On Rectified Linear Units for Speech Processing," ICASSP, p. 3517-3521, 2013.
Wilpon et al., "Improvements and Applications for Key Word Recognition Using Hidden Markov Modeling Techniques," IEEE 1991, 309-312.
Weintraub, "Keyword-Spotting Using SRI's Decipher™ Large-Vocabuarly Speech-Recognition System," IEEE 1993, 463-466.
Tabibian et al., "An Evolutionary based discriminative system for keyword spotting," IEEE, 83-88, 2011.
Silaghi, "Spotting Subsequences matching a HMM using the Average Observation Probability Criteria with application to Keyword Spotting," American Association for Artificial Intelligence, 1118-1123, 2005.
Silaghi et al., "Iterative Posterior-Based Keyword Spotting Without Filler Models," IEEE 1999, 4 pages.
Schalkwyk et al., "Google Search by Voice: A case study," 1-35, 2010.
Rose et al., "A Hidden Markov Model Based Keyword Recognition System[1]," IEEE 1990, 129-132.
Rohlicek et al., "Continuous Hidden Markov Modeling for Speaker-Independent Word Spotting," IEEE 1989, 627-630.
Parlak et al., "Spoken Term Detection for Turkish Broadcast News," ICASSP, IEEE, 2008, 5244-5247.
Miller et al., "Rapid and Accurate Spoken Term Detection," INTERSPEECH 2007, Aug. 27-31, 2007, 314-317.
Mamou et al., "Vocabulary Independent Spoken Term Detection," SIGIR'07, Jul. 23-27, 2007, 8 pages.
Li et al., "A Whole Word Recurrent Neural Network for Keyword Spotting," IEEE 1992, 81-84.
Lei et al., "Accurate and Compact Large Vocabulary Speech Recognition on Mobile Devices," INTERSPEECH 2013, Aug. 25-29, 2013, 662-665.
Jaitly et al., "Application of Pretrained Deep Neural Networks to Large Vocabulary Conversational Speech Recognition," Department of Computer Science, University of Toronto, UTML TR 2012001, Mar. 12, 2012, 11 pages.
Le et al., "Building High-level Features Using Large Scale Unsupervised Learning," Proceedings of the 29$^{th}$ International Conference on Machine Learning, Jul. 12, 2012, 11 pages.
Hughes et al., "Recurrent Neural Networks for Voice Activity Detection," ICASSP 2013, IEEE 2013, 7378-7382.
Heigold et al., "Multilingual Acoustic Models Using Distributed Deep Neural Networks," 2013 IEEE International Conference on Acoustics, Speech and Signal Processing (ICASSP), May 26-31, 2013, 8619-8623.
Grangier et al., "Discriminative Keyword Spotting," Speech and Speaker Recognition: Large Margin and Kernel Methods, 2001, 1-23.
Fernandez et al., "An application of recurrent neural networks to discriminative keyword spotting," ICANN'07 Proceedings of the 17th international conference on Artificial neural networks, 2007, 220-229.
Dean et al., "Large Scale Distributed Deep Networks," Advances in Neural Information Processing Systems 25, 2012, 1-11.
Caruana, "Multitask Learning," CMU-CS-97-203 paper, School of Computer Science, Carnegie Mellon University, Sep. 23, 1997, 255 pages.
Dahl et al., "Large Vocabulary Continuous Speech Recognition with Context-Dependent DBN-HMMS," IEEE, May 2011, 4 pages.
Caruana, "Multitask Learning," Machine Learning, 28, 41-75 (1997).

\* cited by examiner

TRANSFER LEARNING FOR DEEP NEURAL NETWORK BASED HOTWORD DETECTION

CROSS-REFERENCE TO RELATED APPLICATION

This application claims the benefit of U.S. Provisional Application Ser. No. 61/899,449, filed on Nov. 4, 2013, which is incorporated by reference

BACKGROUND

Automatic speech recognition is one technology that is used in mobile devices. One task that is a common goal for this technology is to be able to use voice commands to wake up and have basic spoken interactions with the device. For example, it may be desirable to recognize a "hotword" that signals that the mobile device should activate when the mobile device is in a sleep state.

SUMMARY

In general, one innovative aspect of the subject matter described in this specification can be embodied in methods that include the actions of training a deep neural network with a first training set by adjusting values for each of a plurality of weights included in the neural network, and training the deep neural network to determine a probability that data received by the deep neural network has features similar to key features of one or more keywords or key phrases, the training comprising providing the deep neural network with a second training set and adjusting the values for a first subset of the plurality of weights, wherein the second training set includes data representing the key features of the one or more keywords or key phrases. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The first training set has a first size and the second training set has a second size which may be smaller than the first size. The method may comprise not adjusting, after training the deep neural network with the first training set, the values for a second subset of the plurality of weights while adjusting the values for the first subset of the plurality of weights, wherein the first subset of weights and the second subset of weights are disjoint subsets of the plurality of weights.

The first training set and the second training set may comprise sets of feature values for uttered speech. The first training set may comprise sets of feature values for uttered speech from a first language and the second training set may comprise sets of feature values for uttered speech from a second language different than the first language. The first training set comprises sets of features values for uttered speech with output values relevant to large vocabulary dictation in the same language as the one or more keywords or key phrases. The method may comprise receiving, by the deep neural network and after providing the deep neural network with the second training set, a feature vector that models an audio waveform, and generating, by the deep neural network, a probability for each of the keywords or key phrases using the feature vector and the values of the plurality of weights. The method may comprise generating a confidence score by combining two or more consecutive probabilities for the same keyword or key phrase, the consecutive probabilities corresponding with feature vectors that model different consecutive portions of an audio waveform, and determining whether the audio waveform included the keyword or the key phrase using the confidence score.

The subject matter described in this specification can be implemented in particular embodiments so as to realize one or more of the following advantages. In some implementations, a system trained with transfer learning may have a small memory footprint, low latency, and/or low computational cost. In some implementations, a system trained with transfer learning may have high accuracy. In some implementations, a deep neural network is trained to directly predict key phrases, keywords and/or sub-word units of the keywords. In some implementations, a system may make a determination about every ten milliseconds regarding whether or not a keyword or key phrase has been identified. In some implementations, determining a posterior probability for an entire word as output for a deep neural network reduces the number of neural network parameters in an output layer of the neural network, allows a simple posterior handling method to make a determination regarding whether or not a window includes a keyword or a key phrase, and/or achieves better performance than determining a posterior probability for a sub-word unit. The use of a deep neural network and/or transfer learning in a speech recognition system may increase computational efficiency compared to other speech recognition systems.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

A deep neural network is trained with a first training set of feature vectors that model audio waveforms of words or sub-word units. After the initial training, the deep neural network may identify a phrase, a word, or a sub-word unit that corresponds with an input feature vector or determine a probability that a phrase, a word or a sub-word unit corresponds with the input feature vector.

The deep neural network is then trained with a second, potentially smaller training set for determining whether feature vectors correspond with specific keywords and key phrase and spotting the specific keywords and key phrases in audio waveforms represented by the feature vectors.

The specific keywords and key phrases identified with the second training set may be in the same language as the keywords identified with the first training set or may be in a different language. For example, a speech recognition system may train a deep neural network using feature vectors that model English audio waveforms and then train the deep neural network using feature vectors the model German audio waveforms.

A user device may use the deep neural network to analyze received audio waveforms and determine if a sequence of frames from an audio waveform include a digital representation of one of the specific keywords or key phrases that correspond with the second training set. Upon determination that a sequence of frames contains a digital representation of one of the specific keywords, or has probability above a threshold probability that the sequence of frames contains a digital representation of one of the specific keywords, the user device may perform an action that corresponds with the one of the specific keywords. For instance, the user device may exit a standby state, launch an application, or perform another action.

Figure 1:
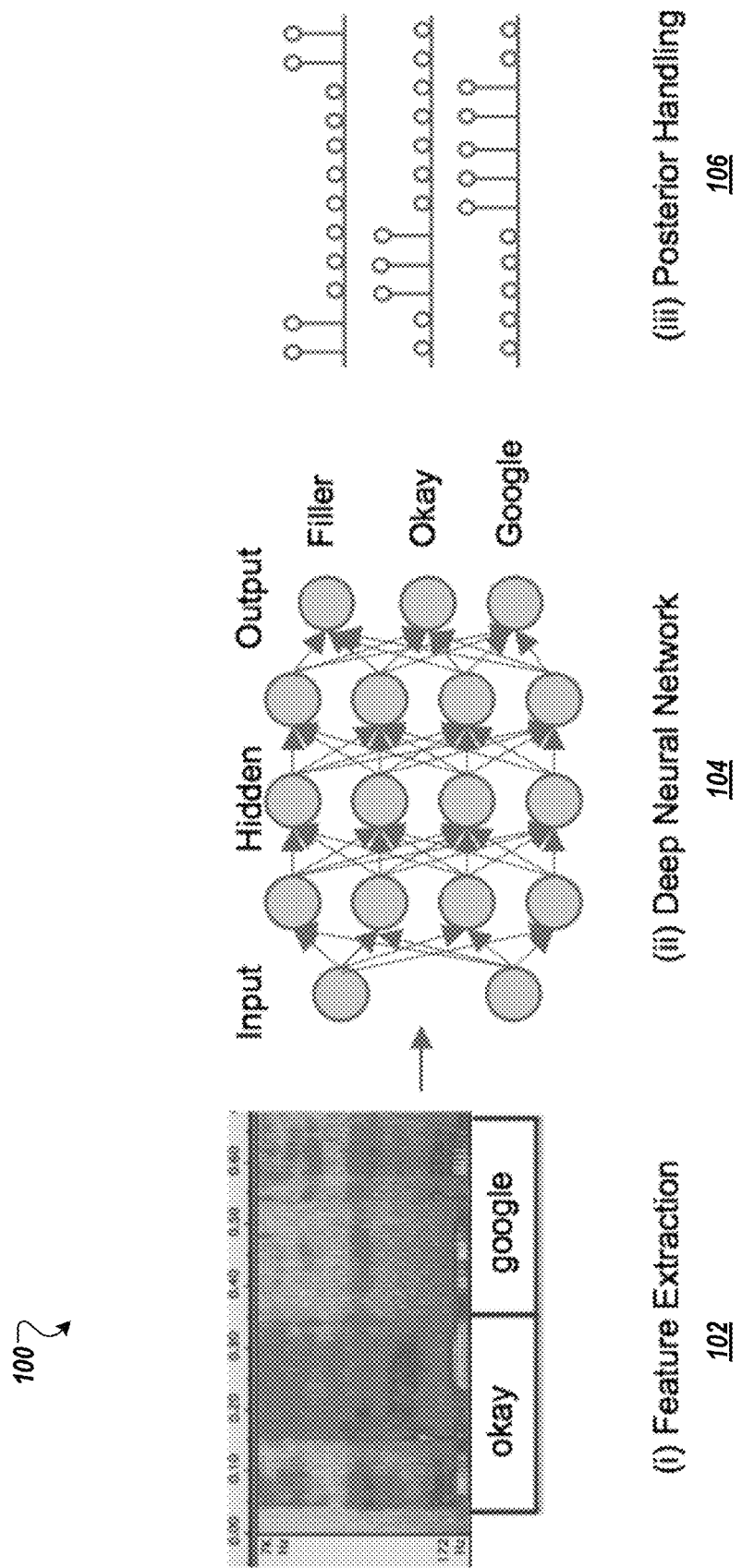
FIG. 1 is an example of a speech recognition system with a deep neural network.

FIG. 1 is an example of a speech recognition system 100 with a deep neural network. The speech recognition system 100 includes a feature extraction module 102, a deep neural network 104, and a posterior handling module 106. The feature extraction module 102 performs voice-activity detection and generates a feature vector for every frame of audio data, e.g., from an audio waveform. For example, the speech recognition system 100 may receive a digital representation of speech, e.g., as a continuous stream of data, and split the stream into multiple frames of data, e.g., where each frame is associated with 10 milliseconds of audio stream data.

The feature extraction module 102 may analyze each of the frames to determine feature values for the frames and places the features values in feature vectors which can be stacked, e.g., using left and right context of adjacent feature vectors, to create a larger feature vector.

A feature vector, for a single frame or a stacked vector for multiple frames, is provided to the deep neural network 104 that is trained to predict posterior probabilities from the features values included in a feature vector. The posterior probabilities correspond with entire words or sub-word units for the keywords or key phrases and represent the probability that a keyword or key phrase is included in a frame or multiple consecutive frames.

The posterior handling module 106 combines the posterior probabilities from multiple feature vectors into a confidence score used to determine whether or not a keyword or a key phrase was included in the digital representation of speech, e.g., included in the frames that correspond with the feature vectors.

For example, as shown in FIG. 1, the speech recognition system 100 may receive a digital representation of speech for a window of time where the digital representation of speech includes data representing the key-phrase "okay google". The speech recognition system 100 divides the window into twelve frames. The feature extraction module 102 determines features values for each of the twelve frames, creates feature vectors with the corresponding feature values for the twelve frames, and provides the twelve feature vectors to the deep neural network 104.

In the example shown in FIG. 1, the deep neural network 104 was trained to identify probabilities for three categories of content including the probability that a feature vector corresponds with the keywords "okay", and "google", and the probability that the feature vector does not correspond with either of the keywords, e.g., and is "filler". The deep neural network 104 analyzes each of the twelve feature vectors and generates frame-level posterior probabilities for each of the three categories and provides the frame-level posterior probabilities to the posterior handling module 106.

The posterior handling module 106 combines the probabilities for the frames to determine a final confidence score for the received window. For example, the posterior handling module 106 combines the probabilities and determines that the window included "filler" in the first two frames, the keyword "okay" in the next three frames, e.g., where each of the frames is associated with a different portion of the keyword, the keyword "google" in frames six through ten, and "filler" in the remaining two frames. The determination may be specific to a particular frame or for the entire window.

In some implementations, the feature extraction module 102 analyzes only the portions of a digital representation of speech that are determined to include speech to reduce computation. For example, the feature extraction module 102 may include a voice-activity detector that may use thirteen-dimensional perceptual linear prediction (PLP) features and their deltas and double-deltas as input to a thirty-component diagonal covariance Gaussian Markov Model, to generate speech and non-speech posteriors for each frame. The feature extraction module 102 may perform temporal smoothing on the speech and non-speech posteriors to identify regions where the speech posteriors exceed a threshold and the corresponding frame is likely to include speech.

For frames that include speech regions, the feature extraction module 102 may generate acoustic features based on forty-dimensional log-filterbank energies computed every ten milliseconds over a window of twenty-five milliseconds. The feature extraction module 102 may stack contiguous frames to add sufficient left and right context, e.g., as the speech recognition system 100 receives additional data and the analysis of the frames progresses, and provide feature vectors for the stack of frames to the deep neural network 104. For example, the input window may be asymmetric since each recently received frame may add about ten milliseconds of latency to the speech recognition system 100. In some implementations, the speech recognition system 100 stacks ten recently received frames and thirty previously received frames.

The deep neural network 104 may be a feed-forward fully connected neural network with k hidden layers and n hidden nodes per layer where each node computes a non-linear function of the weighted sum of the output of the previous layer. In some implementations, some of the layers may have a different number of nodes.

The nodes in the output layer may use softmax activation functions to determine an estimate of the posterior probability of each output category. The nodes in the hidden layers of the deep neural network 104 may use rectified linear unit (ReLU) functions to determine output using the received input from the previous layer or the values from the feature vectors, e.g., for the initial layer of nodes.

In some implementations, the size of the deep neural network 104 is determined based on the number of output categories, e.g., keywords and/or key phrases and filler.

The output categories of the deep neural network 104 can represent entire words or sub-word units in a keyword or a key-phrase. For instance, during keyword or key-phrase detection, the output categories of the deep neural network 104 can represent entire words. The deep neural network 104 may receive the output categories during training and the output categories may be context dependent, e.g., specific to a particular device, software application, or user. For example, the output categories may be generated at training time via forced alignment using a standard Gaussian mixture model based large vocabulary continuous speech recognition system, e.g., a dictation system.

The deep neural network 104 is trained to determine a posterior probability $p_{i,j}$ for the $i^{th}$ output category and the $j^{th}$ frame $x_j$, where the values of i are between 0 and n−1, with n the number of total categories. In some implementations, 0 corresponds with the category for non-keyword content, e.g., content that corresponds with the "filler" category. The parameters, e.g., the weights and biases, of the deep neural network 104, θ, may be estimated by maximizing the cross-entropy training criterion over the labeled training data $\{x_j, i_j\}_j$ using Equation (1) below.

$$F(\theta) = \Sigma_j \log(p_{i_j,j}) \quad (1)$$

In some implementations, the deep neural network 104 may be trained with a software framework that supports distributed computation on multiple CPUs in deep neural networks. In some implementations, the deep neural network 104 is trained using asynchronous stochastic gradient descent with an exponential decay for the learning rate.

Some of the deep neural network 104 parameters are initialized with the corresponding parameters of an existing deep neural network of the same size and similar type of training dataset, and are not trained from scratch. For example, the deep neural network 104 is previously trained for speech recognition with a suitable initial training set to initialize the hidden layers of the deep neural network where the parameters for all layers of the deep neural network 104 are updated during training. The deep neural network 104 is then trained using a second training set, potentially smaller than the initial training set that includes data for the output categories, e.g., the specific keywords and key phrases which the deep neural network 104 will identify.

In some implementations, a first training set includes features values for uttered speech with output values relevant to large vocabulary dictation. A neural network for large vocabulary continuous speech recognition (LVCSR) may produce these output values e.g., as sub-word units. For instance, sub-word units may be n-grams, triphones, or variable length phoneme sequences. In one example, a LVCSR system, e.g., executing on a server, may have 14K states, e.g., compared to a smaller embedded system which may have 2K states. The number of states may be selected by considering all triphones possible and pruning them to the most frequent triphones found in a respective language, e.g., English, using a Decision Tree. The deep neural network 104 may then be trained with the second training set that includes feature values for speech uttered in the same language as the speech represented by the first training set.

Some of the parameters of the deep neural network 104 may remain constant when the deep neural network 104 is trained with the second training set. For instance all of the parameters for a particular layer, other than the output layer, may be held constant while training the deep neural network 104 with the second training set. In some examples, the parameters for two or more nodes in different layers may be held constant while training the deep neural network 104 with the second training set. This form of training may allow the hidden layers to learn a better and more robust feature representation by exploiting larger amounts of data and avoiding bad local optima.

For example, the deep neural network 104 may be trained initially using three-thousand hours of speech, where all of the parameters of the deep neural network 104 are adjusted during training. The deep neural network 104 may then be trained using examples for each keyword, e.g., "okay" and "google," and using negative examples, e.g., for the "filler" category, where some of the parameters of the deep neural network 104 are adjusted while others remain constant.

The negative examples may include anonymized voice search queries or other short phrases. In some examples, the deep neural network 104 is trained using about one thousand to about two thousand, e.g., 2.2-2.3 k, keyword or key phrase training examples in the second training set. In some examples, the deep neural network 104 is trained using between about 1 k to about 40 k keyword or key phrase training examples in the second training set. In some examples, the deep neural network 104 is trained using about 70 k to about 133 k negative examples in the second training set.

When the deep neural network 104 is trained with the second training set, for the specific keywords and/or key phrases, the deep neural network 104 may discard the output layer generated with the first training set and create a new output layer, e.g., with one output node for each keyword and key phrase, and optionally one output node for "filler".

The deep neural network 104 may be trained to determine posterior probabilities for specific keywords, key phrases, key sub-word units, or a combination of the three. In some implementations, the deep neural network 104 may trained to determine a posterior probability for a keyword that is also included in a key phrase. For example, the posterior handling module 106 may combine the posterior probabilities for two key words to determine a probability for a key phrase.

The deep neural network 104 provides the posterior probabilities to the posterior handling module 106. The posterior handling module 106 may smooth the posterior probabilities over a fixed time window of size $w_{smooth}$ to remove noise from the posterior probabilities, e.g., where posterior probabilities corresponding with multiple frames are used to determine whether a keyword was included in a window. For example, to generate a smoothed posterior probability $p'_{i,j}$ from the posterior probability $p_{i,j}$ for the $i^{th}$ output category and the $j^{th}$ frame $x_j$, where the values of i are between 0 and n−1, with n the number of total categories, the posterior handling module 106 may use Equation (2) below.

$$p'_{i,j} = \frac{1}{j - h_{smooth} + 1} \sum_{k=h_{smooth}}^{j} p_{ik} \quad (2)$$

In Equation (2), $h_{smooth}$=max $\{1, j-w_{smooth}-1\}$ is the index of the first frame within the smoothing window. In some implementations, $w_{smooth}$=30 frames.

The posterior handling module 106 may determine a confidence score for the $j^{th}$ frame $x_j$ within a sliding window of size $w_{max}$ using Equation (3) below.

$$\text{confidence} = \sqrt[n-1]{\prod_{i=1}^{n-1} \max\nolimits_{h_{max} \le k \le j} p'_{ik}} \qquad (3)$$

In Equation (3), $p'_{i_j}$ is the smoothed state posterior, and $h_{max}$=max $\{1, j-w_{max}+1\}$ is the index of the first frame within the sliding window. In some implementations, $w_{max}$=100. In some implementations, when Equation (3) does not enforce the order of the sub-word unit sequence, stacked feature vectors are fed as input to the deep neural network 104 to help encode contextual information.

In some implementations, the speech recognition system 100 is a large vocabulary conversational speech recognition system.

Figure 2:
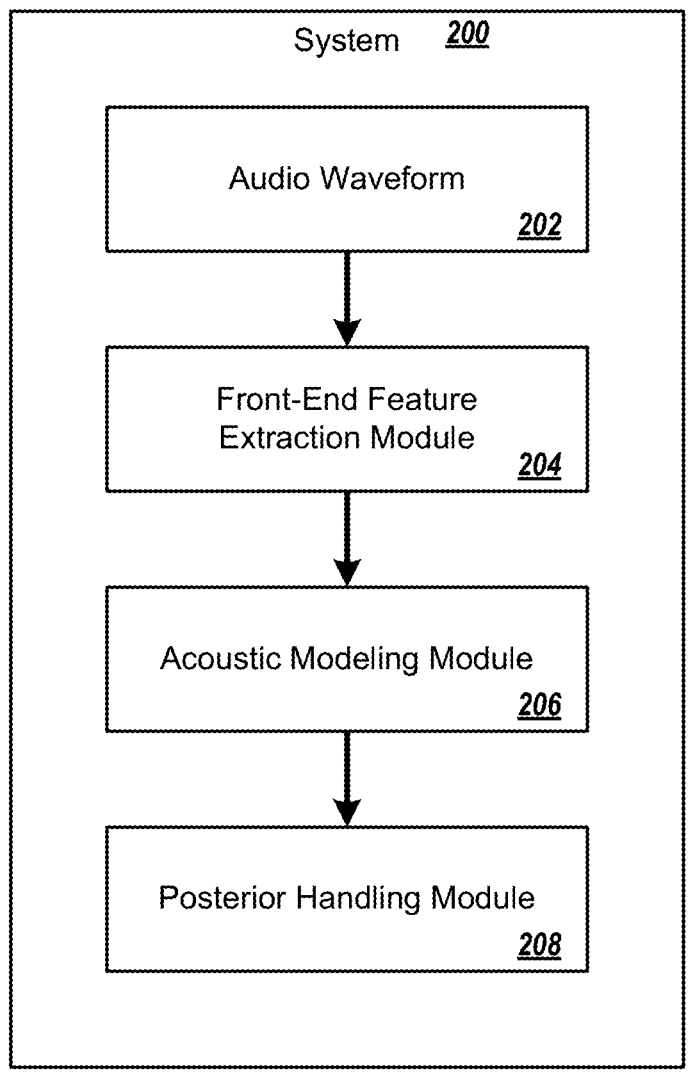
FIG. 2 is an example system for determining whether an audio waveform contains a digital representation of a specific keyword or key phrase.

FIG. 2 is an example system 200 for determining whether an audio waveform contains a digital representation of a specific keyword or key phrase. The system 200, e.g., the speech recognition system 100, receives an audio waveform 202 and provides the audio waveform 202 to a front-end feature extraction module 204. For example, a microphone may capture an analog or digital representation of sound as the audio waveform 202 from a physical environment, e.g., that contains the microphone. The system 200 may include the microphone or another system may include the microphone and send the audio waveform 202 to the system 200.

The front-end feature extraction module 204 analyzes the audio waveform 202 to generate a series of feature vectors, described with reference to FIG. 3. Once the front-end feature extraction module 204 has finished the processing of the audio waveform 202, the front-end feature extraction module 204 sends the features vectors to an acoustic modeling module 206.

The acoustic modeling module 206 may use a variety of techniques, described with reference to FIG. 4, to analyze the feature vectors and produce posterior probability vectors that are representative of whether or not portions of the audio waveform 202 contain specific words or phrases for which the acoustic modeling module is programmed.

Figure 5:
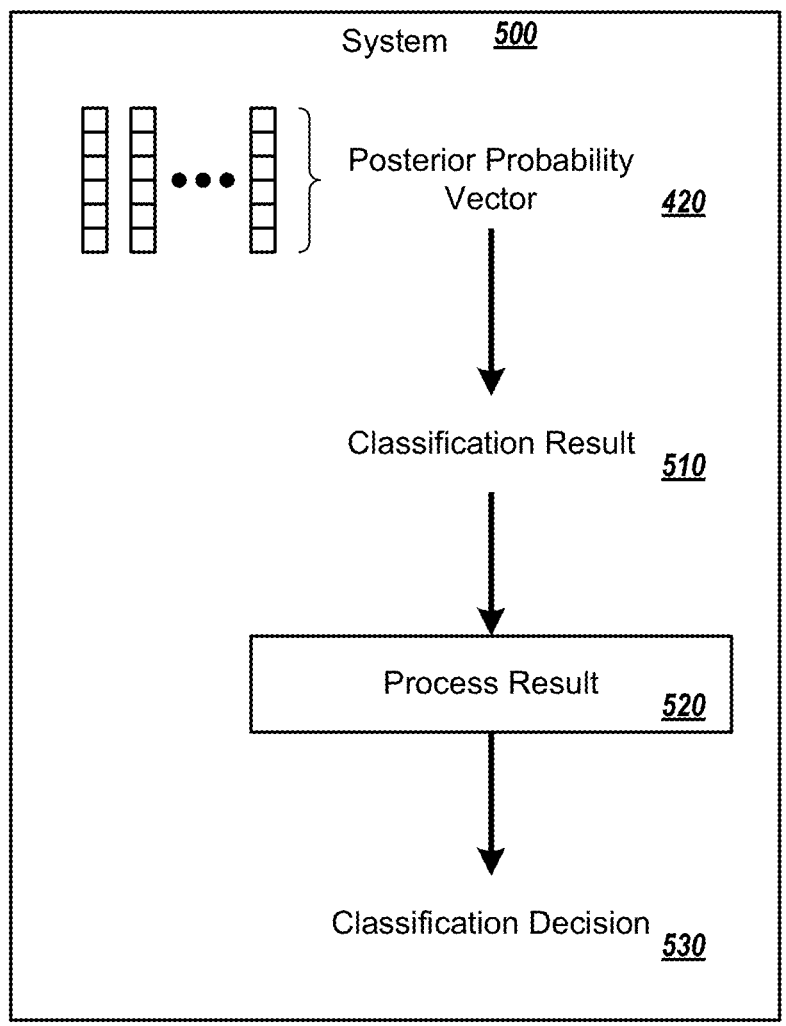
FIG. 5 is a block diagram of an example system for determining when an audio waveform contains a digital representation of a keyword or key phrase.

The acoustic modeling module 206 provides the posterior probability vectors to a posterior handling module 208 that uses the posterior probability vectors to determine a posterior probability, and potentially a confidence score, that indicates whether a keyword or a key phrase is present in the corresponding audio waveform, as describe with reference to FIG. 5.

Various system embodiments are similar in their overall structure. They include modules that use similar architectures to accomplish similar goals: 1) front-end feature extraction, 2) acoustic modeling, and 3) posterior handling.

Figure 3:
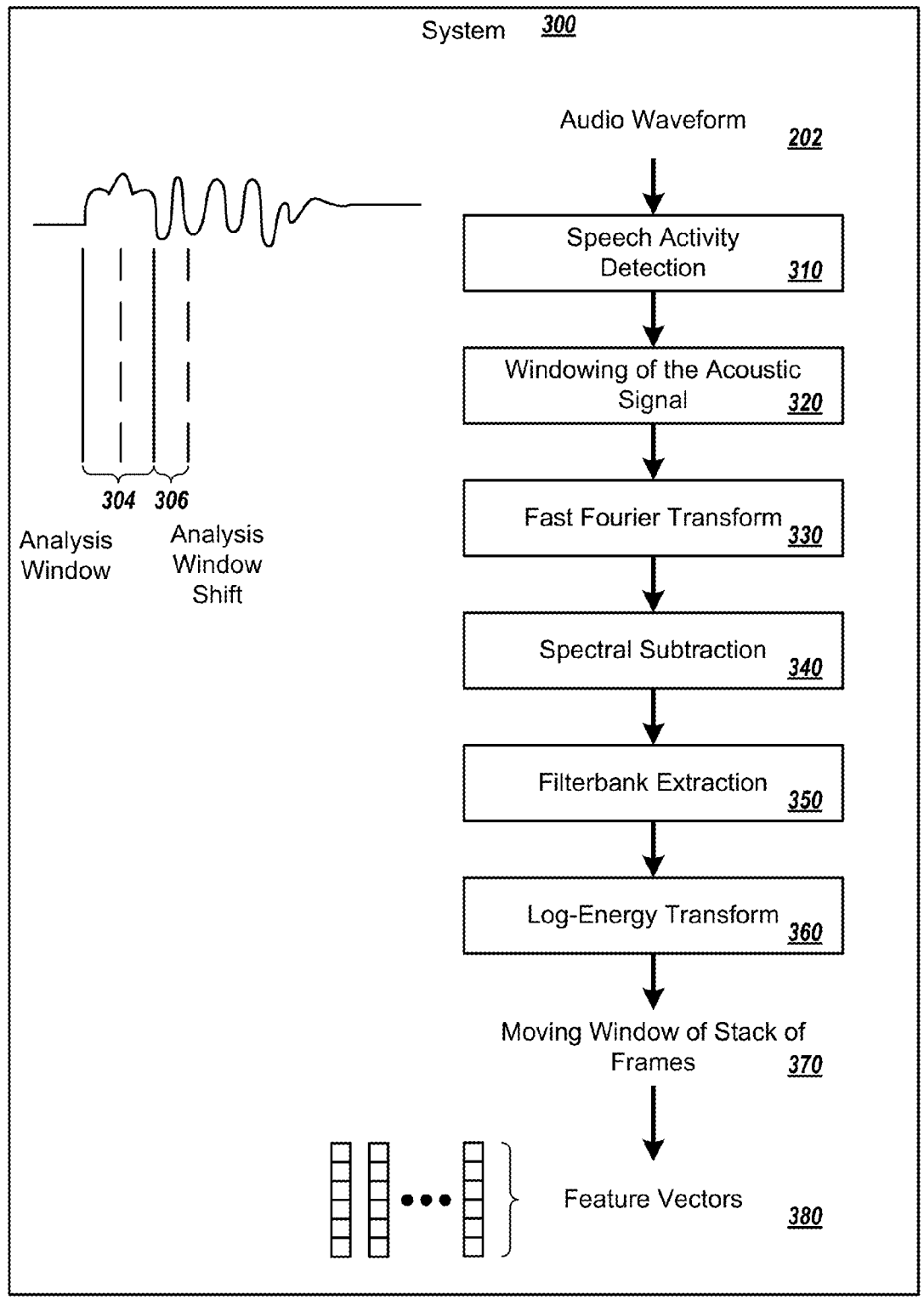
FIG. 3 is a block diagram of an example system for a feature extraction process.

FIG. 3 is a block diagram of an example system 300 for a feature extraction process. For example, the front-end feature extraction module 204 may receive the audio waveform 202. The front-end feature extraction module 204 may analyze the audio waveform 202 by dividing the audio waveform 202 into a plurality of windows and analyzing each of the windows, e.g., separately. For example, the front-end feature extraction module 204 may identify an analysis window 304 with a specific size, e.g., a 25 ms time period, for the audio waveform 202. The front-end feature extraction module 204 may obtain multiple analysis windows in succession by performing an analysis window shift 306, for example a 10 ms time period shift.

One or more analysis windows may overlap. For example, one analysis window may represent audio waveform 202 from a start time of 0 ms to an end time of 25 ms and a subsequent analysis window may represent audio waveform 202 from a start time of 10 ms to an end time of 35 ms.

The analysis windows 304 are obtained as part of speech activity detection 310, in which the system 300 obtains information about available sound in its environment, e.g., the physical environment surrounding a microphone that captured the audio waveform 202. Speech activity detection 310 may occur regardless of whether there is sound in the surrounding environment, or speech activity detection 310 may occur only when the system 300 detects a volume of sound greater than a threshold volume, e.g., in the audio waveform 202.

Once speech activity detection 310 occurs, the front-end feature extraction module 204 creates a plurality of acoustic windows from the acoustic signal 320. In some implementations, each window may have a short time interval, such as 25 ms, that represents characteristics of audio waveform 202 over that time interval.

After windowing, the front-end feature extraction module 204 may perform a Fast Fourier transform 330 on the windowed data to analyze the constituent frequencies present in the audio waveform.

In some implementations, the front-end feature extraction module 204 may perform spectral substitution 340 to minimize the noise in the windowed data, e.g., the transformed windowed data. The spectral substitution may minimize any potential negative effects of noise in the audio waveform 202 during later processing.

The front-end feature extraction module 204 may perform filter bank extraction 350 to separate individual components of the audio data from one another. Each of the individual components generated during filter bank extraction 350 may carry a single frequency sub-band of the audio waveform 202 or the windowed data.

In some implementations, the front-end feature extraction module 204 performs a log-energy transform 360 on the received data to normalize the data, e.g., the windowed data. The normalization of the data may enhance relevant features in the data that are used in subsequent processing.

The front-end feature extraction module 204 generates a moving window of a stack of frames 370. The stack of frames 370 may include eleven frames, each including data represent 25 ms of the audio waveform 202, with a shift of 10 ms between consecutive frames. The stack of frames 370 may include as few as two frames or any larger number of frames, such as fifty frames. The size of the stack of frames 370 may depend on the length of the keyword, key phrase, or acoustic unit predicted by the system 200.

The front-end feature extraction module 204 generates a plurality of feature vectors 380 that represent acoustic features of frames from the audio waveform 202 by performing the aforementioned analytical techniques to obtain information about characteristics of the audio waveform 202 for successive time intervals.

Figure 4:
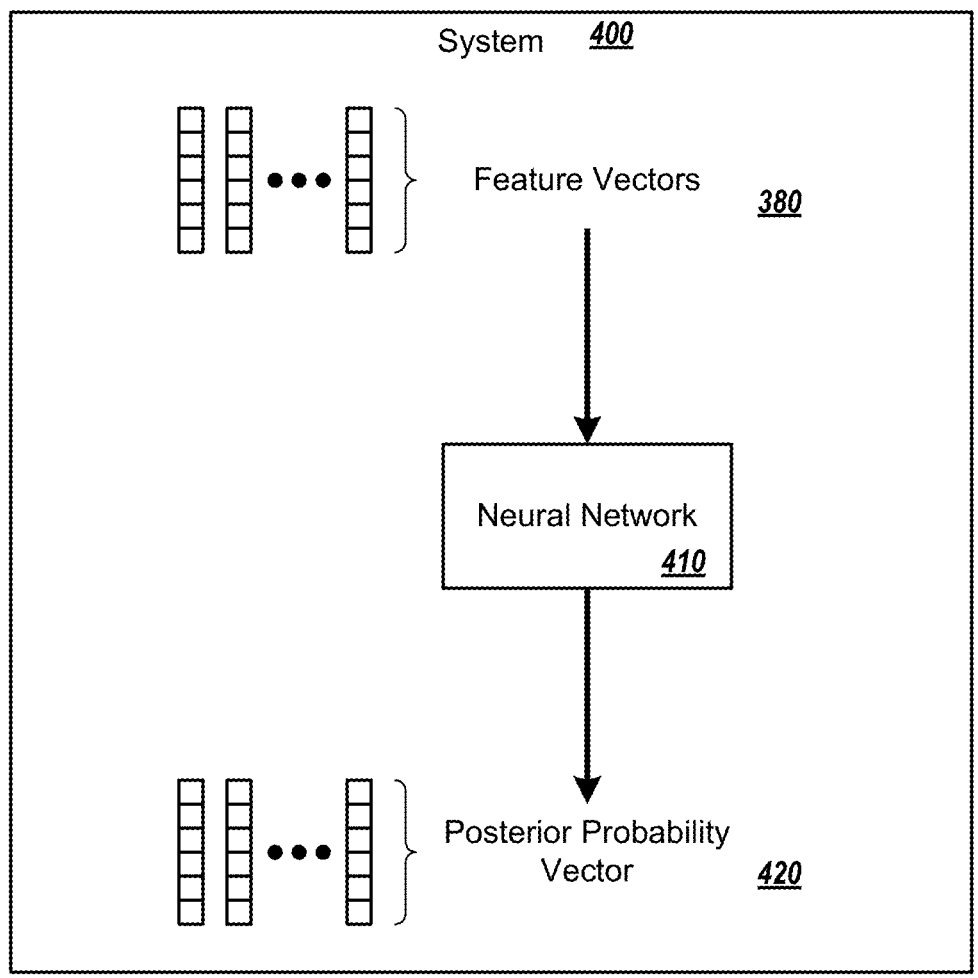
FIG. 4 is a block diagram of an example system for determining a posterior probability vector.

FIG. 4 is a block diagram of an example system 400 for determining a posterior probability vector. The acoustic modeling module 206, shown in FIG. 1, receives the plurality of feature vectors 380 from the front-end feature extraction module 204 and generates a corresponding posterior probability vector 420 for each of the feature vectors 380. For a particular feature vector, the corresponding posterior probability vector 420 includes a value for each of the keywords or key phrases for which the speech recognition system is trained. The value indicates the probability that the frame represented by the feature vector includes at least a portion of a digital representation of speech of the corresponding keyword or key phrase.

The acoustic modeling module 206 includes a neural network 410, such as the deep neural network 104 described with reference to FIG. 1, that generates the corresponding set of posterior probability vectors 420, where each of the posterior probability vectors 420 corresponds with one of the feature vectors 380.

The acoustic modeling module 206 is trained to determine whether a stack of feature vectors matches a keyword or key phrase. For example, the neural network 410 may receive a training set of two expected event vectors for the keywords "Okay" and "Google" or one expected event vectors for the key phrase "Okay Google". As discussed above, the neural network 410 is trained with a first, general training set and a second, specific training set, e.g., where the second training set includes the expected event vectors for the keywords "Okay" and "Google" or the one expected event vector for the key phrase "Okay Google".

In this example, the acoustic modeling module 206 processes each of the feature vectors 380 using the neural network 410 to determine if properties of the feature vector match the properties of the expected event vectors for the keywords "Okay" and "Google" and generates a posterior probability for each of the expected event vectors where the posterior probability is representative of the similarity of the properties. For instance, a higher score may represent a greater similarity between a feature vector and an expected event vector compared to a lower score. In some examples, a lower score may represent a greater similarity between a feature vector and an expected event vector compared to a higher score.

When the acoustic modeling module 206 processes a first feature vector and the acoustic modeling module 206 is programmed to identify two keywords, "Okay" and "Google," a first posterior probability vector corresponding to the first feature vector includes at least two posterior probability scores, one for each of the keywords. Each of the posterior probability scores represents the degree of acoustic match between the first feature vector and the expected event vectors. The acoustic modeling module may use Equation (2) above to determine a posterior probability.

For example, when the first feature vector is associated with the spoken word "Okay," the scores for "Okay" and "Google" may be 1.0 and 0.0 respectively. In some examples, when the first feature vector is associated with the spoken word "Search," the scores for "Okay" and "Google" are both 0.0. In some examples, when the first feature vector is associated with the spoken word "Google," the scores for "Okay" and "Google" are 0.0 and 0.95 respectively, e.g., when there may be a potentially small difference between the first feature vector and the expected event vector for "Google".

In some implementations, the posterior probability vector 420 may include a "non-keyword" or "filler" posterior probability score. For example, the filler score for a feature vector associated with the spoken word "Okay" would be 0.0 and the filler score for the spoken word "Search" may be 1.0 when the acoustic modeling module 206 includes only two keywords, "Okay" and "Google." In these implementations, when the acoustic modeling module 206 is programmed to identify two keywords, the first posterior probability vector 420 includes at least three scores.

In some implementations, a sum of the posterior probability scores in a posterior probability vector 420 is 1.0. For example, the sum of the posterior probability scores for the spoken word "Okay" would be 1.0 (the "Okay" keyword score)+0.0 (the "Google" keyword score)+0.0 (the filler score)=1.0 and the sum of the scores for the spoken word "Google" may be 0.0 (the "Okay" keyword score)+0.95 (the "Google" keyword score)+0.05 (the filler score)=1.0.

The posterior probability scores may represent the confidence of the acoustic modeling module 206 that the acoustic properties of a feature vector match an expected event vector. In some examples, when the acoustic modeling module 206 identifies a match between a feature vector and an expected event vector, the corresponding posterior probability score might not be 1.0 based on a variance between the feature vector and the expected event vector, such as with the example for the spoken word "Google" above.

In some implementations, the acoustic modeling module 206 may determine a confidence score from a posterior probability score or multiple posterior probability scores. For example, the acoustic modeling module 206 may determine a confidence score using Equation (3) above.

In some implementations, an expected event vector may represent a key phrase. For example, a first expected event vector may correspond with the key phrase "Okay Google" and a second expected event vector may correspond with the keyword "Google." In this example, when the acoustic modeling module 206 receives a feature vector for the spoken phrase "Okay Google," the posterior probability score for the key phrase "Okay Google" may be 0.7 and the posterior probability score for the key phrase "Google" may be 0.3.

In some implementations, the acoustic modeling module 206 scores a key phrase based on the order of the words or sub-word units in the key phrase. For example, when a key phrase includes the sub-word units "oh," "kay," "g$\overline{oo}$," and "gə l," the acoustic modeling module 206 determines whether a continuous sequence of four feature vectors acoustically match the expected event vectors for the sub-word units "oh," "kay," "g$\overline{oo}$," and "gə l," and assigns a posterior probability score to the sequence of feature vectors accordingly. The acoustic modeling module 206 may generate a posterior probability vector for each set of four continuous feature vectors where the posterior probability vector includes scores that represent the similarity of the feature vectors to the key phrase and any other keywords or key phrases for which the acoustic modeling module 206 is trained. If the acoustic modeling module 206 identifies four feature vectors that are similar to the sub-word units "oh," "kay," "g$\overline{oo}$," and "gə l" but in a different order, the corresponding score in a posterior probability vector is low, e.g., 0.0.

In some implementations, the acoustic modeling module 206 may be trained to identify words or phrases spoken by a particular user. For example, the acoustic modeling module 206 may be trained to identify a pronunciation of the particular user speaking keywords or key phrases such that when a different user speaks the specific keywords or key phrases, the acoustic modeling module 206 generates low keyword posterior probability scores for the keywords or key phrases spoken by the different user, e.g., 0.0. In these implementations, the training data for the acoustic modeling module 206 may include data representing the specific keywords spoken by the particular user and data representing the specific keywords spoken by different users. For instance, the second training set may include examples of the keywords and key phrases spoken by the particular user, e.g., as positive examples, and keywords and key phrases spoken by other users, e.g., as negative examples.

FIG. 5 is a block diagram of an example system 500 for determining when an audio waveform contains a digital representation of a keyword or key phrase. For example, the posterior handling module 208 receives the posterior probability vector 420 from the acoustic modeling module 206. In some examples, the posterior handling module 208 may use support vector machine or logistic regression to make a binary decision about whether a keyword or a key phrase was uttered during a time window of the audio waveform 202 that is associated with the posterior probability vector 420.

The posterior handling module 208 produces classification result 510. This may be an actual classification decision 530, in terms of a Boolean decision confirming that a keyword or a key phrase was present in the audio waveform 202 or not.

In some implementations, the classification result 510 may be a posterior probability score and/or a confidence score, e.g., for a particular one of the keywords or key phrases. For example the posterior probability score may represent the likelihood that a keyword or a key phrase is present in the audio waveform 202 or a frame from the audio waveform 202. If classification result 510 is a posterior probability score, e.g., and not a binary value, the posterior handling module 208 may process the result 520 to generate the classification decision 530, for example, by comparing the classification result 510 with a threshold value.

In some implementations, the posterior handling module 208 combines corresponding posterior probability scores from multiple posterior probability vectors 420 to determine whether a keyword or key phrase was uttered during a time window of the audio waveform 202. For example, the posterior handling module 208 may average twenty posterior probability scores associated with the keyword "Google" from twenty consecutive posterior probability vectors and use the average, e.g., as a single posterior probability for a time period, to determine whether "Google" was spoken during the time period that corresponds with the twenty consecutive posterior probability vectors. In this example, the posterior handling module 208 would also average the posterior probability scores for the other keywords or key phrases represented in the posterior probability vectors, such as the "Okay" keyword posterior probability scores and the filler posterior probability scores.

The posterior handling module 208 may use any appropriate window for the consecutive posterior probability scores. For example, the posterior handling module 208 may average the corresponding scores from eleven consecutive posterior probability vectors.

The posterior handling module 208 uses the combination of the posterior probability scores to determine whether the keyword or key phrase was spoken during the time window of the audio waveform 202. For example, the posterior handling module 208 determines whether the combination is greater than a predetermined threshold value and, if so, determines that the keyword or key phrase associated with the combined posterior probability scores was likely spoken during the time window of the audio waveform 202.

In some implementations, the posterior handling module 208 combines corresponding posterior probability scores from multiple posterior probability vectors 420 by determining a geometric mean, a sum, or a product of the scores.

In some implementations, the posterior handling module 208 determines a maximum value of the posterior probability scores corresponding to a particular keyword or key phrase as the combination of the posterior probability scores. For example, the posterior handling module 208 may determine a maximum posterior probability score value from one-hundred consecutive posterior probability vectors 420 and use the maximum value when determining whether the audio waveform 202 includes the keyword or key phrase. In some examples, when the maximum value is greater than a predetermined threshold, the posterior handling module 208 determines that the keyword or key phrase was included in the audio waveform 202.

The posterior handling module 208 may move a window and/or may use windows of different sizes when determining whether a keyword or key phrase was spoken during a different portion of the audio waveform 202. For example, the posterior handling module 208 may look at different overlapping or non-overlapping windows and determine a combination of the posterior probability scores for the different window.

In some implementations, the posterior handling module 208 enforces the order of words or sub-word units associated with keywords or key phrases. For example, when the acoustic modeling module generates posterior probability scores for words that are portions of a key phrase, the posterior handling module 208 determines whether the portions of the key phrase occurred in the correct order when determining whether the key phrase was recorded in the audio waveform 202.

For example, when the key phrase is "Okay Google" and the posterior handling module 208 receives a first posterior probability vector with a score of 1.0 for "Okay" and a second posterior probability vector with a score of 1.0 for "Google," where the first posterior probability vector corresponds with a portion of the audio waveform immediately prior to the portion of the audio waveform that corresponds with the second posterior probability vector without any intermediate portions, the posterior handling module 208 determines that the key phrase "Okay Google" was recorded in the audio waveform 202. The posterior handling module 208 may perform a similar process for portions of keywords, such as "goo" and "gle" or "g$\overline{oo}$" and "gə l".

In some examples, when the posterior handling module 208 determines that a first posterior probability vector has a score of 1.0 for "Google" and a second posterior probability vector has a score of 1.0 for "Okay," where the second posterior probability vector corresponds with a later portion of the audio waveform 202 than the first posterior probability vector and/or at least one feature vector corresponds with a portion of the audio waveform 202 between the portions of the audio waveform that correspond with the first and second posterior probability vectors. In these examples, the posterior handling module 208 determines that the key phrase "Okay Google" was not recorded in those portions of the audio waveform 202.

Figure 6:
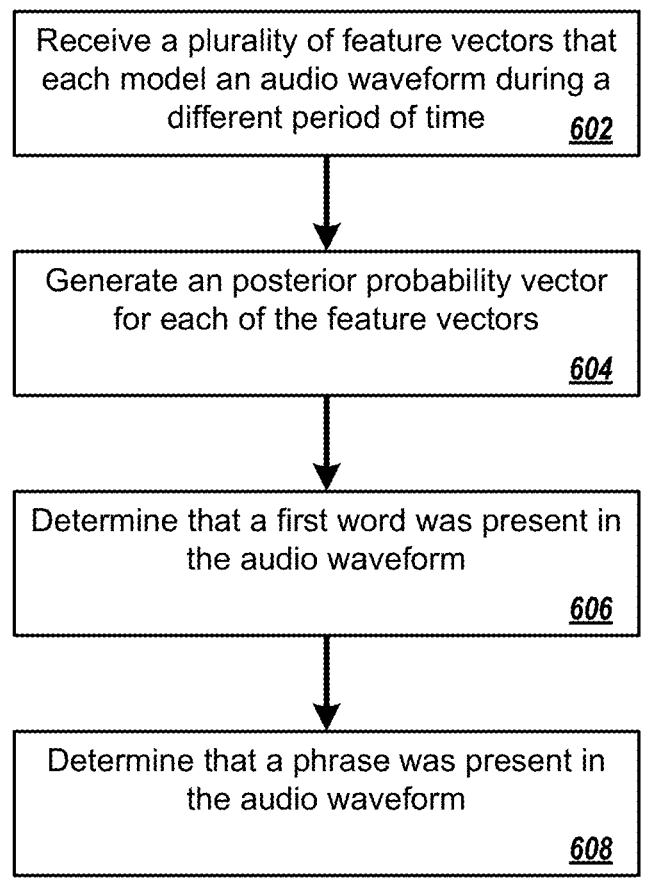
FIG. 6 is a flowchart of an example process for detecting keyword utterances in an audio waveform.

FIG. 6 is a flowchart of an example process 600 for detecting keyword utterances in an audio waveform.

The process receives feature vectors (602). For example, step 602 may be performed as described with reference to FIG. 3, such that the front-end feature extraction module 204 processes the audio waveform 202 to yield the feature vectors 380.

The process generates a posterior probability vector for each of the feature vectors (604). Each posterior probability vector includes a set of posterior probability scores that characterize an acoustic match between the corresponding feature vector and a set of expected event vectors. Each of the expected event vectors corresponds with one of the posterior probability scores and defines acoustic properties of at least a portion of a keyword. In some implementations, a sum of the set of posterior probability scores for each posterior probability vector is one.

The process determines that a first word was present in the audio waveform (606). For example, the posterior handling module determines that the first word was present in the audio waveform during an overall period of time modeled by the feature vectors by combining corresponding posterior probability scores from the posterior probability vectors. The first word corresponds with at least one keyword or with at least a portion of one of the key phrases, a corresponding one of the expected event vectors, and a corresponding one of the scores in the posterior probability vector.

In some implementations, the posterior handling module combines the posterior probability scores by averaging, by determining a geometric mean, by determining a sum, a product, or a maximum score for each of the corresponding posterior probability scores from the posterior probability vectors.

The process determines that a phrase was present in the audio waveform (608). For example, the posterior handling module determines that a predetermined key phrase was present in the audio waveform during the overall period of time modeled by the feature vectors. The predetermined phrase includes the first word and potentially a second word that corresponds to at least another portion of the key phrase and a corresponding one of the expected event vectors.

The predetermined key phrase represents a key phrase for which the acoustic modeling module is programmed to identify. For example, the first and the second words might not be keywords alone but combine to form a key phrase that is of importance for the posterior handling module when the first and second words are identified in sequence.

For example, when the posterior handling module determines that the second word occurred in the audio waveform immediately prior to the first word, the posterior handling module determines that the audio waveform does not include the predetermined key phrase, assuming no other specific words were identified for which the acoustic modeling module was programmed.

When the posterior handling module identifies the first word immediately prior to the second word, without any intervening words and based on the posterior probability vectors, the posterior handling module determines that the audio waveform includes a key phrase and provides data associated with the key phrase to another module in a system, e.g., that performs an action based on the keyword or the key phrase.

In some implementations, the process 600 can include additional steps, fewer steps, or some of the steps can be divided into multiple steps. For example, the acoustic modeling module may perform steps 602 through 606 without performing step 608, e.g., when identifying a keyword and not a key phrase.

In some implementations, the acoustic modeling module uses a neural network, e.g., a deep neural network, to generate the posterior probability vector. For example, the neural network may be trained, prior to the generation of the posterior probability vector, with a set of training feature vectors that includes the expected event vectors. In some examples, each of the set of training feature vectors includes properties of spoken sub-word units associated with keywords or key phrases. The training feature vectors includes the properties of the expected event vectors such that training with the expected event vectors teaches the neural network the combination of properties to identify that correspond with each of the expected event vectors and the sub-word units of the keywords and key phrases.

In some implementations, the set of training feature vectors comprises a plurality of general feature vectors where each of the general feature vectors is different from all of the expected event vectors and corresponds with words different from the keywords. For example, the general feature vectors include properties of sub-word units not included in any of the keywords or key phrases the acoustic modeling module identifies, e.g., general speech that does not include the keywords or key phrases. The neural network may use the general feature vectors to identify combinations of properties that are not associated with any of the expected event vectors, e.g., as negative training data. The negative training data may be associated with a filler category or posterior probability determined by the neural network.

Figure 7:
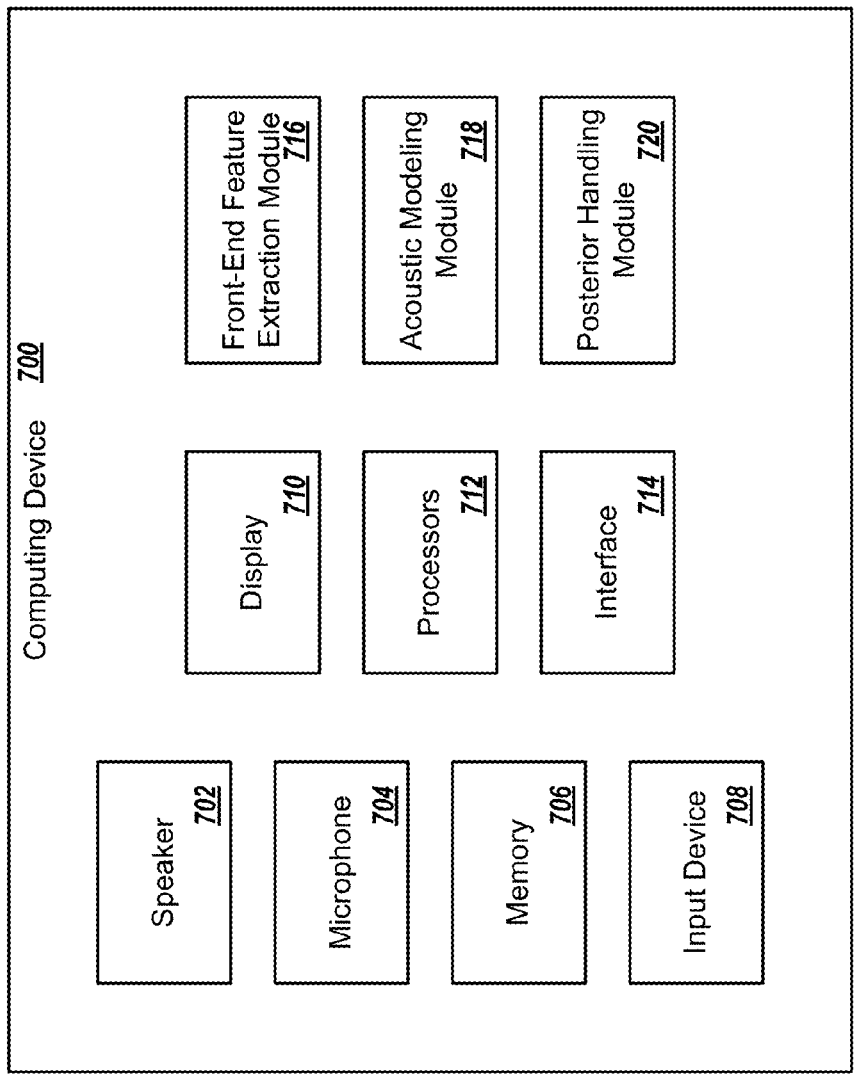
FIG. 7 is a block diagram of an example computing device that can detect keyword and key phrase utterances in an audio waveform.

FIG. 7 is a block diagram of an example computing device 700 that can detect keyword and key phrase utterances in an audio waveform. The computing device 700 contains a variety of constituent parts and modules that may be implemented through appropriate combinations of hardware, firmware, and software that allow the computing device 700 to function as an embodiment of appropriate features.

The computing device 700 contains one or more processors 712 that may include various hardware devices designed to process data. The processors 712 are communicatively coupled to other parts of computing device 700. For example, the processors 712 may be coupled to a speaker 702 and a microphone 704 that allow output and input of audio signals to and from an area that physically surrounds the computing device 700. The microphone 704 may provide the raw signals that capture aspects of the audio waveform 202 that are processed in other portions of the computing device 700.

The computing device 700 may include a memory 706. The memory 706 may include a variety of memory storage devices, such as persistent storage devices that allow permanent retention and storage of information manipulated by the processors 712.

An input device 708 allows the receipt of commands by the computing device 700 from a user, and an interface 714 allows computing device 700 to interact with other devices to allow the exchange of data. The processors 712 may be communicatively coupled to a display 710 that provides a graphical representation of information processed by the computing device 700 for the presentation to a user.

The processors 712 may be communicatively coupled to a series of modules that perform the functionalities necessary to implement the method of embodiments that is presented in FIG. 6. These modules include a front-end feature extraction module 716, which performs as described with reference to FIG. 3, an acoustic modeling module 718, which performs as described with reference to FIG. 4, and a posterior handling module 720, which performs as described with reference to FIG. 5.

The acoustic modeling module 718 may use a deep neural network, e.g., described with reference to FIG. 1 above. For instance, the deep neural network is specific to a particular set of keywords and key phrases and, for each input feature vector, outputs a posterior probability score vector with values for each of the keywords and key phrases.

As discussed above, the task of keyword detection is an important component in some speech recognition applications. For example, when the vocabulary size is limited, or when the task requires activating a device, for example, a phone, by saying a word, keyword detection is applied to classify whether an utterance contains a word or not and whether the word is a particular word or part of a phrase for which the device has been programmed to identify.

For example, the task performed by some embodiments includes detecting a single word, for example, "Google," that will activate a device from a standby mode to perform a task. The device continuously monitors received audio waveforms for the predetermined keywords and/or key phrases.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 8:
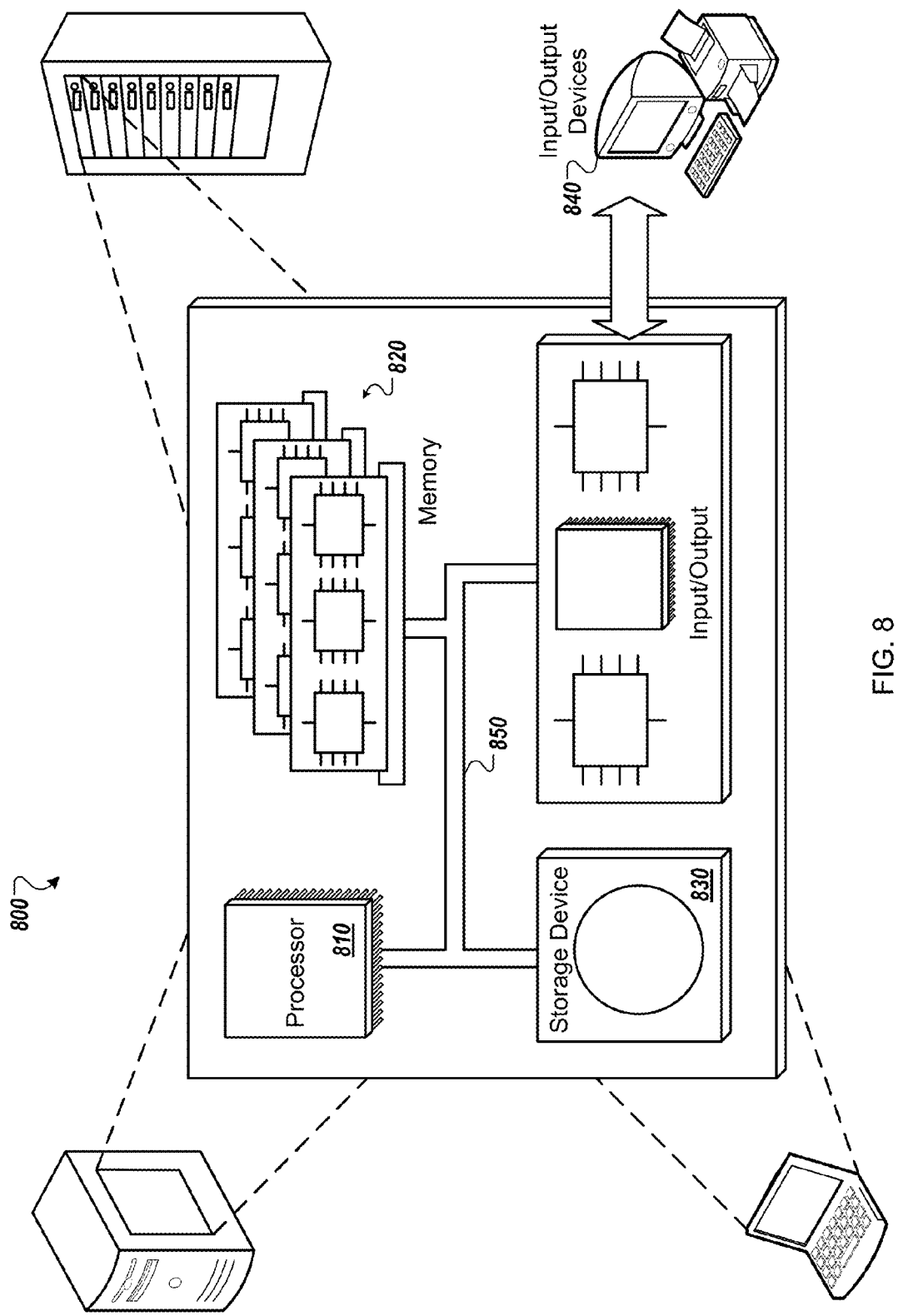
FIG. 8 is a block diagram of a computing system that can be used in connection with computer-implemented methods described in this document.

An example of one such type of computer is shown in FIG. 8, which shows a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   training, by a speech recognition system that includes at least one computer, a deep neural network to determine probabilities that data received by the deep neural network has features similar to key features of words in a set of words, the training comprising:
   providing the deep neural network with a first set of feature values for uttered speech, and
   adjusting values for each of a plurality of weights included in the neural network; and
   training, by the speech recognition system, the deep neural network to determine a probability that data received by the deep neural network has features similar to key features of one or more keywords or key phrases, the training comprising:
   providing the deep neural network that was previously trained using the first set of feature values with a second set of feature values for uttered speech, and
   adjusting the values for a first subset of the plurality of weights, wherein a first quantity of the words in the set of words is greater than a second quantity of the one or more keywords or key phrase, and the second set of feature values for uttered speech includes data representing the key features of the one or more keywords or key phrases and is a different set of feature values than the first set of feature values.

2. The method of claim 1, wherein:
   the first training set has a first quantity of words; and
   the second training set has a second quantity of words that is less than the first quantity of words.

3. The method of claim 1, comprising:
   maintaining, after training the deep neural network with the first training set, the values for a second subset of the plurality of weights constant while adjusting the values for the first subset of the plurality of weights, wherein the first subset of the plurality of weights and the second subset of the plurality of weights are disjoint subsets of the plurality of weights.

4. The method of claim 3, wherein maintaining the values for a second subset of the plurality of weights constant while adjusting the values for the first subset of the plurality of weights comprises:
   maintaining the values of weights for a hidden layer in the deep neural network constant while adjusting the values of weights for an output layer in the deep neural network.

5. The method of claim 1, wherein providing the deep neural network that was previously trained using the first set of feature values with a second set of feature values for uttered speech comprises providing the deep neural network that was previously trained using a first set of feature values for uttered speech from a first language with the second set of feature values for uttered speech from a second language different than the first language.

6. The method of claim 1, wherein providing the deep neural network that was previously trained using the first set of feature values with a second set of feature values for uttered speech comprises providing the deep neural network that was previously trained using a first sets of features values for uttered speech from a particular language with the second set of values for uttered speech in the same particular language.

7. The method of claim 1, comprising:
providing, by the speech recognition system and after training the deep neural network to determine a probability that data received by the deep neural network has features similar to key features of one or more keywords or key phrases, the deep neural network to a hotword detection system for use detecting only utterances of the one or more keywords or key phrases encoded in audio waveforms.

8. The method of claim 1, comprising:
using, by a hotword detection system and after training the deep neural network to determine a probability that data received by the deep neural network has features similar to key features of one or more keywords or key phrases, the deep neural network to detect only utterances of the one or more keywords or key phrases encoded in an audio waveform.

9. The method of claim 8, wherein using the deep neural network to detect only utterances of the one or more keywords or key phrases encoded in an audio waveform comprises:
receiving, by the deep neural network, a feature vector that models an audio waveform; and
generating, by the deep neural network, a probability for each of the keywords or key phrases using the feature vector and the values of the plurality of weights.

10. The method of claim 9, wherein using the deep neural network to detect only utterances of the one or more keywords or key phrases encoded in an audio waveform comprises:
generating a confidence score by combining two or more consecutive probabilities for the same keyword or key phrase, the consecutive probabilities corresponding with feature vectors that model different consecutive portions of an audio waveform; and
determining whether the audio waveform included the keyword or the key phrase using the confidence score.

11. A speech recognition system comprising:
one or more computers and one or more storage devices storing instructions that are operable, when executed by the one or more computers, to cause the one or more computers to perform operations comprising:
training a deep neural network to determine probabilities that data received by the deep neural network has features similar to key features of words in a set of words, the training comprising:
providing the deep neural network with a first set of feature values for uttered speech, and
adjusting values for each of a plurality of weights included in the neural network; and
training the deep neural network to determine a probability that data received by the deep neural network has features similar to key features of one or more keywords or key phrases, the training comprising:
providing the deep neural network that was previously trained using the first set of feature values with a second set of feature values for uttered speech, and
adjusting the values for a first subset of the plurality of weights, wherein a first quantity of the words in the set of words is greater than a second quantity of the one or more keywords or key phrase, and the second set of feature values for uttered speech includes data representing the key features of the one or more keywords or key phrases and is a different set of feature values than the first set of feature values.

12. The system of claim 11, wherein:
the first training set has a first quantity of words; and
the second training set has a second quantity of words that is less than the first quantity of words size.

13. The system of claim 11, the operations comprising:
maintaining, after training the deep neural network with the first training set, the values for a second subset of the plurality of weights constant while adjusting the values for the first subset of the plurality of weights, wherein the first subset of the plurality of weights and the second subset of the plurality of weights are disjoint subsets of the plurality of weights.

14. The system of claim 11, wherein providing the deep neural network that was previously trained using the first set of feature values with a second set of feature values for uttered speech comprises providing the deep neural network that was previously trained using a first set of feature values for uttered speech from a first language with the second set of feature values for uttered speech from a second language different than the first language.

15. The system of claim 11, wherein providing the deep neural network that was previously trained using the first set of feature values with a second set of feature values for uttered speech comprises providing the deep neural network that was previously trained using a first sets of features values for uttered speech from a particular language with the second set of values for uttered speech in the same particular language.

16. The system of claim 11, the operations comprising:
receiving, by the deep neural network and after providing the deep neural network with the second training set, a feature vector that models an audio waveform; and
generating, by the deep neural network, a probability for each of the keywords or key phrases using the feature vector and the values of the plurality of weights.

17. The system of claim 16, the operations comprising:
generating a confidence score by combining two or more consecutive probabilities for the same keyword or key phrase, the consecutive probabilities corresponding with feature vectors that model different consecutive portions of an audio waveform; and
determining whether the audio waveform included the keyword or the key phrase using the confidence score.

18. A non-transitory computer-readable medium storing software comprising instructions executable by a speech recognition system that includes one or more computers which, upon such execution, cause the one or more computers to perform operations comprising:
training a deep neural network to determine probabilities that data received by the deep neural network has features similar to key features of words in a set of words, the training comprising:
providing the deep neural network with a first set of feature values for uttered speech, and adjusting values for each of a plurality of weights included in the neural network; and training the deep neural network to determine a probability that data received by the deep neural network has features similar to key features of one or more keywords or key phrases, the training comprising:

providing the deep neural network that was previously trained using the first set of feature values with a second set of feature values for uttered speech, and adjusting the values for a first subset of the plurality of weights, wherein a first quantity of the words in the set of words is greater than a second quantity of the one or more keywords or key phrase, and the second set of feature values for uttered speech includes data representing the key features of the one or more keywords or key phrases and is a different set of feature values than the first set of feature values.

19. The computer-readable medium of claim 18, wherein:
the first training set has a first quantity of words; and
the second training set has a second quantity of words that is less than the first quantity of words.

20. The computer-readable medium of claim 18, the operations comprising:
maintaining, after training the deep neural network with the first training set, the values for a second subset of the plurality of weights while constant adjusting the values for the first subset of the plurality of weights, wherein the first subset of the plurality of weights and the second subset of the plurality of weights are disjoint subsets of the plurality of weights.

21. The computer-readable medium of claim 18, wherein providing the deep neural network that was previously trained using the first set of feature values with a second set of feature values for uttered speech comprises providing the deep neural network that was previously trained using a first set of feature values for uttered speech from a first language with the second set of sets of feature values for uttered speech from a second language different than the first language.

22. The computer-readable medium of claim 18, wherein providing the deep neural network that was previously trained using the first set of feature values with a second set of feature values for uttered speech comprises providing the deep neural network that was previously trained using a first set of features values for uttered speech from a particular language with the second set of values for uttered speech in the same particular language.

23. The computer-readable medium of claim 18, the operations comprising:
receiving, by the deep neural network and after providing the deep neural network with the second training set, a feature vector that models an audio waveform; and
generating, by the deep neural network, a probability for each of the keywords or key phrases using the feature vector and the values of the plurality of weights.

24. The computer-readable medium of claim 23, the operations comprising:
generating a confidence score by combining two or more consecutive probabilities for the same keyword or key phrase, the consecutive probabilities corresponding with feature vectors that model different consecutive portions of an audio waveform; and
determining whether the audio waveform included the keyword or the key phrase using the confidence score.

* * * * *